US008412960B2

(12) United States Patent
Yoshida

(10) Patent No.: US 8,412,960 B2
(45) Date of Patent: Apr. 2, 2013

(54) RECORDING-MEDIUM STORING POWER CONSUMPTION REDUCTION SUPPORT PROGRAM, INFORMATION PROCESSING DEVICE, AND POWER CONSUMPTION REDUCTION SUPPORT METHOD

(75) Inventor: Taketoshi Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 472 days.

(21) Appl. No.: 12/608,440

(22) Filed: Oct. 29, 2009

(65) Prior Publication Data

US 2010/0138679 A1   Jun. 3, 2010

(30) Foreign Application Priority Data

Dec. 2, 2008   (JP) ................ 2008-307068

(51) Int. Cl.
*G06F 1/32* (2006.01)
*G06F 1/18* (2006.01)
*G06F 1/20* (2006.01)
*G06F 1/26* (2006.01)

(52) U.S. Cl. ........ 713/300; 713/310; 713/320; 713/323; 713/324; 713/340; 700/22; 700/291; 718/104

(58) Field of Classification Search .............. 700/22, 700/291; 713/300, 310, 320–324, 330, 340; 718/100–107

See application file for complete search history.

(56) References Cited

U.S. PATENT DOCUMENTS

| 6,795,928 | B2 * | 9/2004 | Bradley et al. ............... 713/320 |
| 7,447,920 | B2 * | 11/2008 | Sharma et al. ............... 713/300 |
| 8,145,927 | B2 * | 3/2012 | Okitsu et al. ................. 713/320 |
| 8,261,118 | B2 * | 9/2012 | Calo et al. .................... 713/340 |
| 2003/0193777 | A1 * | 10/2003 | Friedrich et al. ............. 361/687 |
| 2006/0259793 | A1 * | 11/2006 | Moore et al. .................. 713/300 |
| 2007/0180117 | A1 * | 8/2007 | Matsumoto et al. ......... 709/226 |
| 2009/0276528 | A1 * | 11/2009 | Pienta et al. .................. 709/226 |

FOREIGN PATENT DOCUMENTS

| JP | 8-314578 | 11/1996 |
| JP | 2000-40067 | 2/2000 |

* cited by examiner

*Primary Examiner* — Fahmida Rahman
(74) *Attorney, Agent, or Firm* — Staas & Halsey LLP

(57) ABSTRACT

An information processing device capable of communicating with a plurality of servers installed within a facility and method are provided. A storage unit stores server information including an installation position and a temperature of each of the servers within the facility. A detection unit detects a group of not-yet-powered-on servers from the plurality of servers. A calculation unit calculates an index value indicating a correlation of heat generation amounts between the not-yet-powered-on server and powered-on servers, based on the server information stored in the storage unit for each detected not-yet-powered-on server. A decision unit decides a server which becomes a power-on target, from the group of the not-yet-powered-on servers, based on the calculated index value of each not-yet-powered-on server. An output unit outputs a decision result which has been decided.

13 Claims, 14 Drawing Sheets

FIG. 6

| NOT-YET-POWERED-ON SERVER ID | POWERED-ON SERVER ID |
|---|---|
| M1 | M2 |
| M3 | M5 |
| M4 | M7 |
| ⋮ | ⋮ |
| Mi | Mj |
| ⋮ | ⋮ |

600

| NOT-YET-POWERED-ON SERVER ID | INDEX VALUE |
|---|---|
| M1 | Q1 |
| M3 | Q3 |
| M4 | Q4 |
| ⋮ | ⋮ |

FIG. 9

| APPLICATION ID | SCHEDULED TIME INSTANT FOR RUN | SCHEDULED TIME INSTANT FOR TERMINATION |
|---|---|---|
| ... | ... | ... |
| AP7 | 21:00 | 23:15 |
| AP24 | 21:05 | 22:30 |
| AP20 | 21:07 | 23:55 |
| ... | ... | ... |
| AP3 | 21:30 | 21:50 |
| ... | ... | ... |

900

RECORDING-MEDIUM STORING POWER CONSUMPTION REDUCTION SUPPORT PROGRAM, INFORMATION PROCESSING DEVICE, AND POWER CONSUMPTION REDUCTION SUPPORT METHOD

CROSS-REFERENCE TO RELATED APPLICATIONS

This application is related to and claims priority to Japanese Patent Application No. 2008-307068, filed on Dec. 2, 2008, and incorporated herein by reference.

BACKGROUND

1. Field

The embodiments disclosed herein are directed to an apparatus and a method for reducing power consumption in facilities such as a data center and a server room which can house a plurality of electronic devices.

2. Description of the Related Art

In recent years, huge and highly complicated data centers, and IT (Information Technology) devices with increased performance and increased density have caused a more serious problem of power consumption in the data centers. Generally, in a rough breakdown of the power consumption (for input power) in the data center, an air conditioner occupies 45%, the IT devices occupy 30%, and a power supply and the like occupy 25%.

Therefore, a key point for reducing the power consumption in the data center is how much power consumption for the air conditioner is reduced. Accordingly, conventionally, in order to improve a cooling efficiency, an air conditioning design based on the assumption of how heated air (hot air) exhausted from servers flows within a room has been performed.

Conventional techniques are not based on the assumption of a facility such as the data center, and in which, in a computer system having a plurality of processors, the processors having a large heat generation amount are powered down and a degraded operation is performed when a capability of the air conditioner is reduced, when a voltage of an input power source is reduced, or the like.

However, the hot air flowing within the data center dynamically varies depending on a load on the servers. Therefore, it is unknown how much air volume can be secured in individual racks, until operations are actually performed. As a result thereof, a hot spot may occur at an unpredictable place, and an air conditioning effect may not be able to be obtained as expected. In such a case, there is a problem in that a load is imposed on the air conditioner, which causes increase in the power consumption.

SUMMARY

It is an aspect of an embodiment to address problems of conventional techniques and to improve uniformization of a temperature distribution, e.g., within the facility, and to reduce the power consumption for the air conditioner.

It is an aspect of the embodiments discussed herein to provide an information processing device capable of communicating with a plurality of servers installed within a facility. A storage unit stores server information including an installation position and a temperature of each of said servers within said facility. A detection unit detects a group of not-yet-powered-on servers from said plurality of servers. A calculation unit calculates an index value indicating a correlation of heat generation amounts between said not-yet-powered-on server and powered-on servers, based on the server information stored in said storage unit for each detected not-yet-powered-on server. A decision unit decides a server which becomes a power-on target, from said group of the not-yet-powered-on servers, based on the calculated index value of each not-yet-powered-on server. An output unit outputs a decision result which has been decided.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 6 illustrates an exemplary power supply state list.

FIG. 9 illustrates an exemplary run schedule list.

DETAILED DESCRIPTION OF THE EMBODIMENTS

A power consumption reduction support program, information processing device, and power consumption reduction support method attempt uniformization of a temperature distribution within a facility, and reduce power consumption for an air conditioner, by determining correlations of heat generation amounts between power-ON servers and power-OFF servers, from distances and temperature ratios thereof, and controlling power ON/OFF of each server. An information processing device may be a power control device in which the power consumption reduction support program has been installed.

Figure 1:
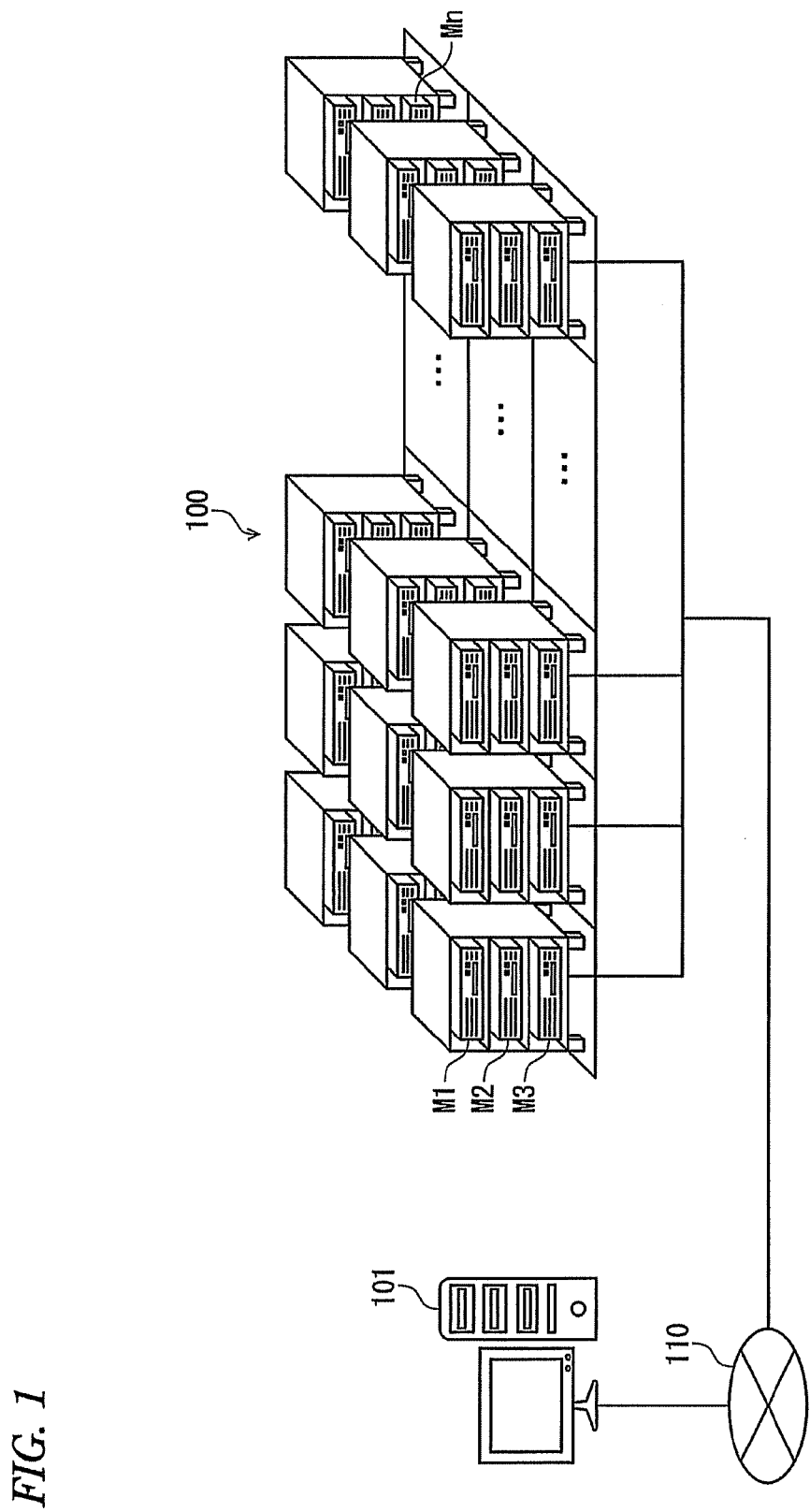
FIG. 1 illustrates a data center.

FIG. 1 illustrates a data center. In FIG. 1, in a data center 100, a power control device 101 and a plurality of servers M1 to Mn are connected so as to be communicable with one another via a network 110 such as the Internet, a LAN (Local Area Network) or a WAN (Wide Area Network).

The data center 100 is a facility which provides connection lines to the network 110, maintenance/operation services and the like for the servers M1 to Mn. This data center 100 is equipped with air conditioning for cooling the servers M1 to Mn which become heat generation sources. The air conditioner in the data center 100 provides overall air conditioning for uniformly controlling a room temperature within a floor.

Figure 4:
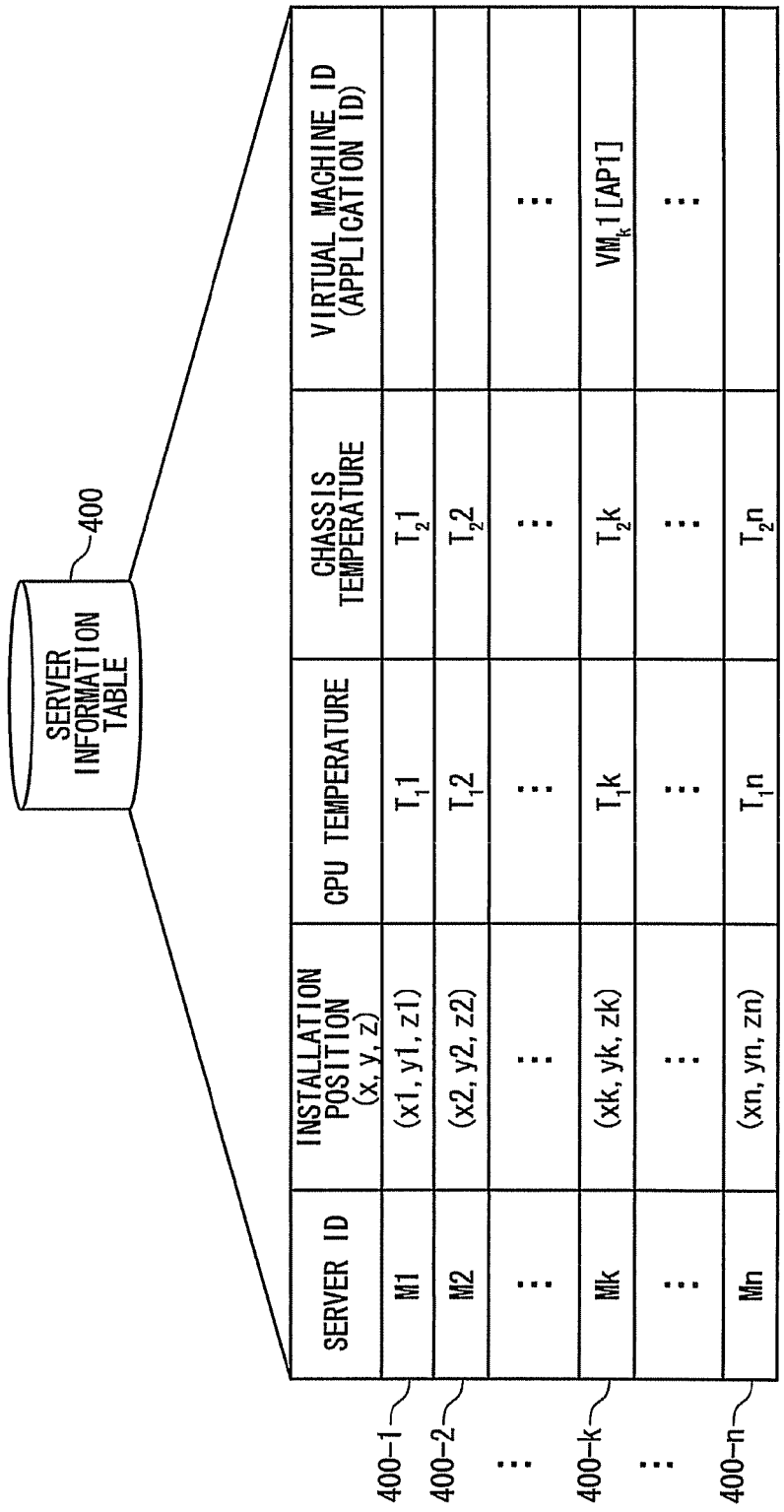
FIG. 4 illustrates exemplary contents stored in a server information table.

The power control device 101 manages an installation position, a CPU (Central Processing Unit) temperature, a chassis temperature, an application running status and the like of each of the servers M1 to Mn, as server information. A detailed description of t server information is illustrated in FIG. 4.

The power control device 101 controls a power supply state of each of the servers M1 to Mn with reference to the server information. For example, the power control device 101 controls power-on and power-off of each of the servers M1 to Mn, in consideration of uniformity of the temperature distribution within the data center 100. Thereby, an occurrence of a local high-temperature space within the floor is suppressed, and the power consumption for the air conditioner is reduced.

The servers M1 to Mn are application servers which run various applications. Each of the servers M1 to Mn has a function of dividing resources (for example, a CPU, a memory, an interface and the like) to construct a plurality of running environments (virtual machines). Thereby, a plurality of applications can be run on one server.

Moreover, each of the servers M1 to Mn transmits a virtual machine ID of an activated virtual machine and an application ID of a running application, to the power control device 101. Furthermore, when the run of the application is completed, each of the servers M1 to Mn transmits a completion report thereof to the power control device 101.

Moreover, a temperature sensor (not illustrated) which measures the CPU temperature and the chassis temperature is embedded in each of the servers M1 to Mn. This temperature sensor can communicate with the power control device 101 via the network 110, and has a function of transmitting the CPU temperature and the chassis temperature unique to each server, to the power control device 101 at a predetermined time interval. Power supplies of the servers M1 to Mn and the temperature sensor are included in separate systems, and the temperature sensor can operate even if the servers M1 to Mn are powered off.

An exemplary outline of a power consumption reduction scheme is disclosed. Generally, in such a facility as the data center 100 which houses the plurality of servers M1 to Mn, an air conditioning design based on the assumption of how heated air (hot air) exhausted from each of the servers M1 to Mn flows within the floor is performed.

However, the hot air exhausted from the servers M1 to Mn dynamically varies depending on a load on each of the servers M1 to Mn. Therefore, it is unknown how much air volume can be secured in individual racks, until operations are actually performed. As a result thereof, a hot spot may occur at an unpredictable place, and an air conditioning effect may not be able to be obtained as expected.

Accordingly, in an exemplary power consumption reduction scheme, the power supply state (ON/OFF) of each server is controlled, and the occurrence of the local high-temperature space within the data center 100 is eliminated. Thereby, the uniformization of the temperature distribution within the data center 100 is attempted, and the power consumption for the air conditioner is reduced. If a new power-on target is decided, the server is decided as the power-on target, in order from the server installed in a space having a high cooling efficiency.

Figure 2:
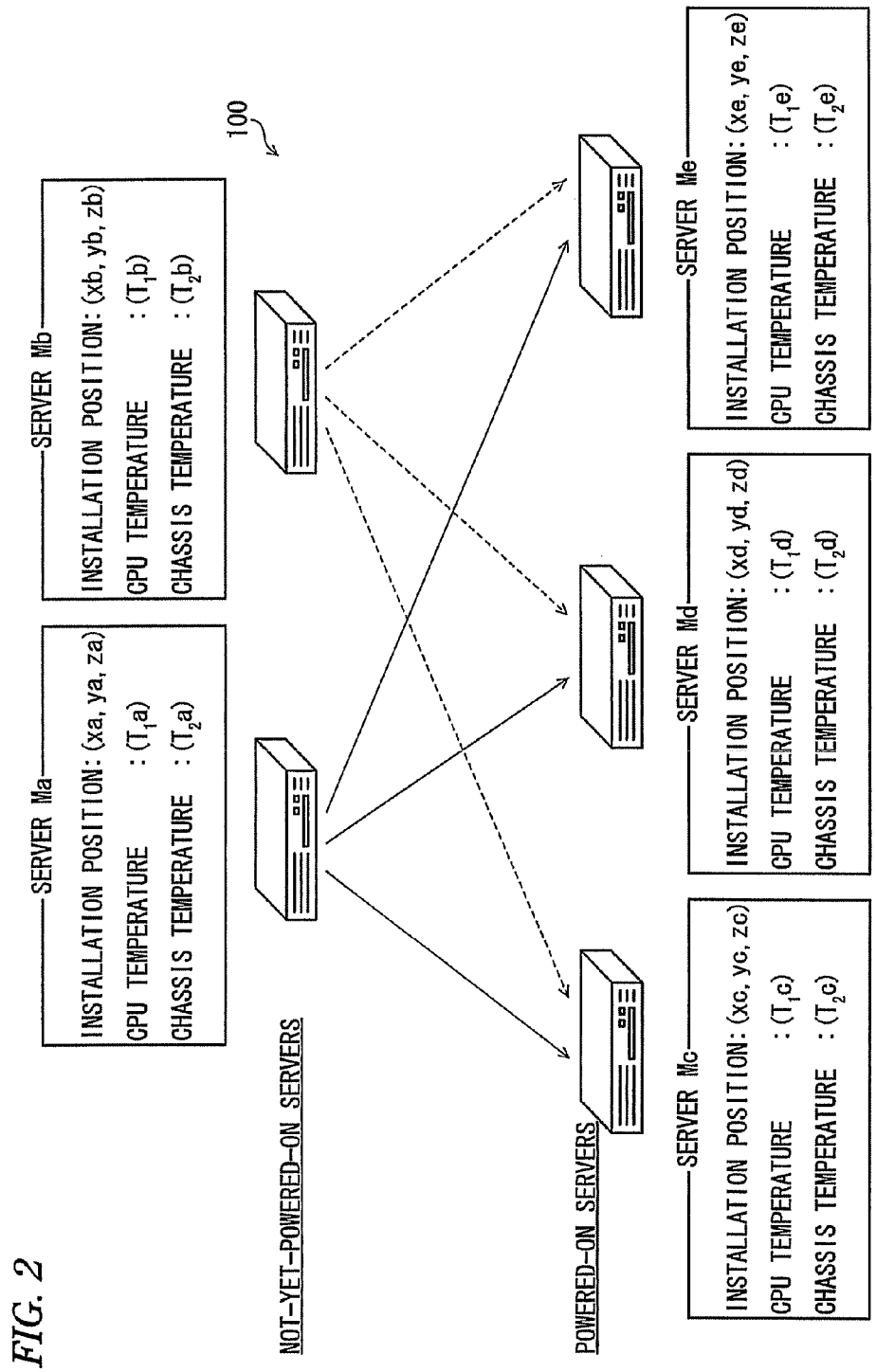
FIG. 2 illustrates a power consumption reduction scheme.

Index values indicating the correlations of the heat generation amounts between not-yet-powered-on servers and powered-on servers are used to decide the power-on target. FIG. 2 illustrates a power consumption reduction scheme. In FIG. 2, servers Ma and Mb are the not-yet-powered-on servers, and servers Mc, Md and Me are the powered-on servers.

Here, in consideration of the following (A) and (B), the index value indicating the correlation of the heat generation amounts between the not-yet-powered-on server Ma and the powered-on servers Mc, Md and Me is calculated. Similarly, in consideration of the following (A) and (B), the index value indicating the correlation of the heat generation amounts between the not-yet-powered-on server Mb and the powered-on servers Mc, Md and Me is calculated.

Distances among servers are disclosed. The not-yet-powered-on servers Ma and Mb, the server installed at a place as far as possible from the powered-on servers Mc to Me is preferentially set as the power-on target. Thereby, a distribution of installation of the powered-on servers which become the heat generation sources can be dispersed, and the occurrence of the local high-temperature space in the data center 100 can be suppressed.

Temperature ratios among servers may be determined as, for example, Temperature=CPU Temperature+Chassis Temperature.

In the not-yet-powered-on servers Ma and Mb, the server having larger temperature ratios to (or larger temperature differences from) the powered-on servers Mc to Me is preferentially set as the power-on target. Thereby, the server which is less affected by the hot air exhausted from the powered-on servers can be set as the power-on target, and an occurrence of a local high-temperature area in the data center 100 can be suppressed.

The index values of the not-yet-powered-on servers Ma and Mb, which indicate the correlations of the heat generation amounts between the not-yet-powered-on servers Ma and Mb and the powered-on servers Mc to Me, are compared with each other, and the server which becomes the power-on target is decided. Moreover, if a temperature distribution of a powered-on server is concentrated on a local space within the data center 100, the server is powered off, and the occurrence of the local high-temperature space is suppressed.

In this way, in an exemplary power consumption reduction scheme, in consideration of the correlations of the heat generation amounts among the servers, the power supply states of the servers are controlled, and thereby, the uniformization of the temperature distribution within the data center 100 is attempted. Thereby, the power consumption for the air conditioner is reduced without any alteration of the air conditioner itself within the data center 100.

Figure 3:
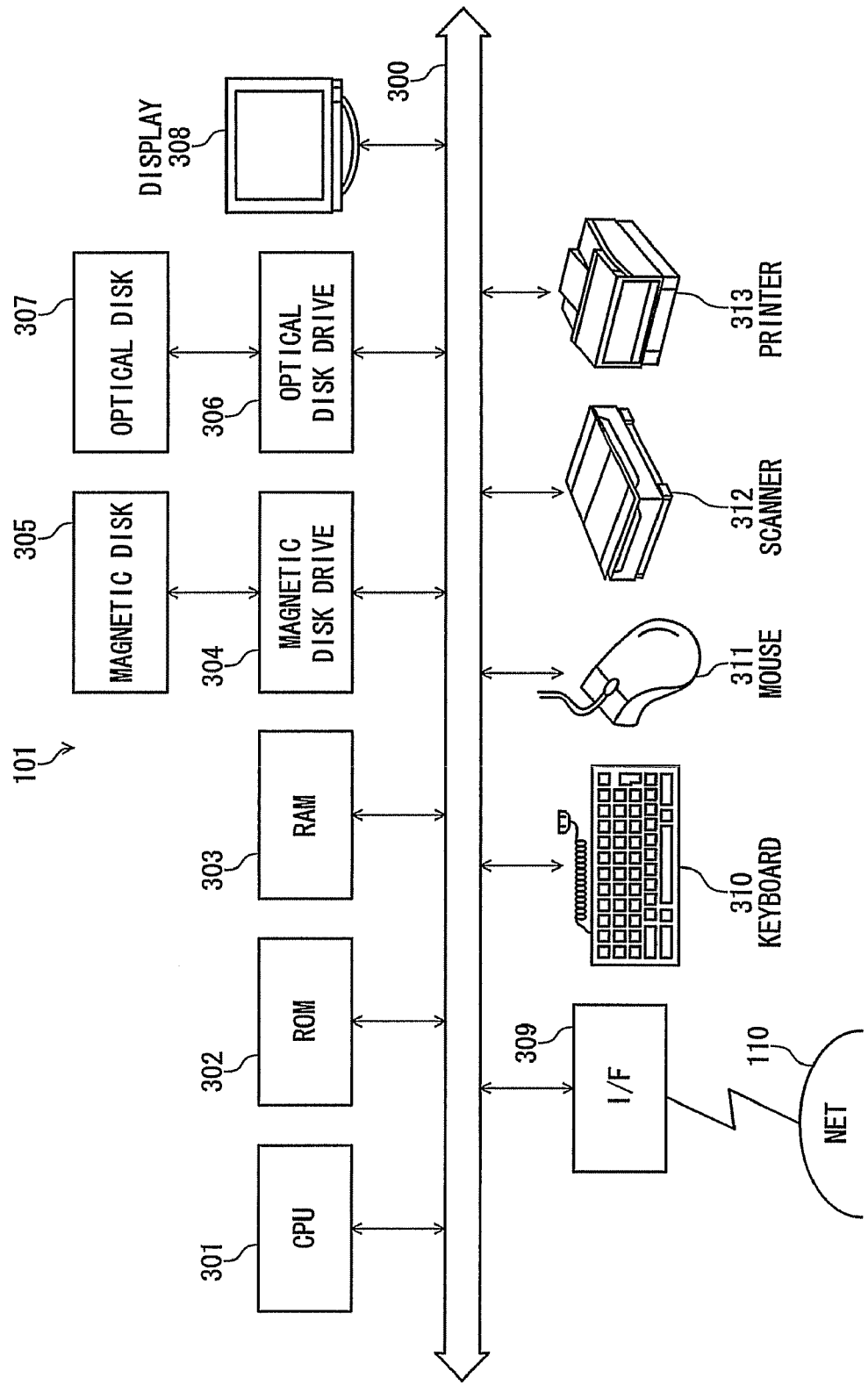
FIG. 3 illustrates a hardware configuration of a power control device.

A hardware configuration of the power control device 101 according to an exemplary embodiment are disclosed. FIG. 3 illustrates the hardware configuration of the power control device. In FIG. 3, the power control device 101 includes a CPU 301, a ROM (Read-Only Memory) 302, a RAM (Random Access Memory) 303, a magnetic disk drive 304, a magnetic disk 305, an optical disk drive 306, an optical disk 307, a display 308, an I/F (Interface) 309, a keyboard 310, a mouse 311, a scanner 312 and a printer 313. Moreover, respective component parts are connected to one another via a bus 300.

Here, the CPU 301 controls the entire power control device 101. The ROM 302 stores programs such as a boot program. The RAM 303 is used as a work area of the CPU 301. The magnetic disk drive 304 controls read/write of data from/to the magnetic disk 305 under the control of the CPU 301. The magnetic disk 305 stores the data written under the control of the magnetic disk drive 304.

The optical disk drive 306 controls read/write of data from/to the optical disk 307 under the control of the CPU 301. The optical disk 307 stores the data written under the control of the optical disk drive 306, or causes a computer to read the data stored in the optical disk 307.

The display 308 displays a cursor, icons or a toolbox, and in addition, data such as documents, images and function information. For example, a CRT, a TFT liquid crystal display, a plasma display or the like can be employed as this display 308.

The interface (Hereinafter abbreviated as "I/F".) 309 is connected to the network 110 such as the LAN (Local Area Network), the WAN (Wide Area Network) or the Internet, through a communication line, and is connected to other devices (for example, the servers M1 to Mn) via this network 110. The I/F 309 is in charge of an interface between the network 110 and an inside of the device, and controls input/output of data from an external device. For example, a modem, a LAN adapter or the like can be employed as the I/F 309.

It should be noted that, although the hardware configuration of the power control device 101 has been herein described, the servers M1 to Mn can also be realized with a similar hardware configuration.

Contents stored in a server information table used in the power control device 110 are disclosed. FIG. 4 illustrates exemplary the contents stored in the server information table. In FIG. 4, a server information table 400 has fields for a server ID, the installation position, the CPU temperature, the chassis temperature and the virtual machine ID. Server information 400-1 to 400-n has been stored as records by setting information in each field.

Here, the server ID is an identifier for identifying each of the servers M1 to Mn. The installation position is a coordinate position of each of the servers M1 to Mn in the data center 100. Specifically, an x-coordinate and a y-coordinate indicate the coordinate position in a horizontal direction within the floor. A z-coordinate indicates a tier number in a rack in which each of the servers M1 to Mn has been installed, that is, the coordinate position in a vertical direction within the floor. It should be noted that an origin has been set at an arbitrary point within the floor.

The CPU temperature is a surface temperature of the CPU of each of the servers M1 to Mn. The chassis temperature is a surface temperature of a chassis (server case) which houses various component parts included in each of the servers M1 to Mn. The virtual machine ID is an identifier for identifying the activated virtual machine on the servers M1 to Mn. Moreover, the application ID for identifying a currently running application is added to the virtual machine ID.

Here, in an example of a server Mk, the CPU temperature is "$T_1k$", and the chassis temperature is "$T_2k$". Moreover, the virtual machine ID of the virtual machine operating in the running environment on the server Mk is "$VM_k1$", and the application ID of the application running on the virtual machine $VM_k1$ is "AP1".

It should be noted that the installation position in the server information 400-1 to 400-n is updated each time an arrangement of the servers M1 to Mn is changed. The CPU temperature and the chassis temperature are updated each time information is received from the temperature sensor in each of the servers M1 to Mn. The virtual machine ID and the application ID are updated each time depending on the application running status.

Figure 5:
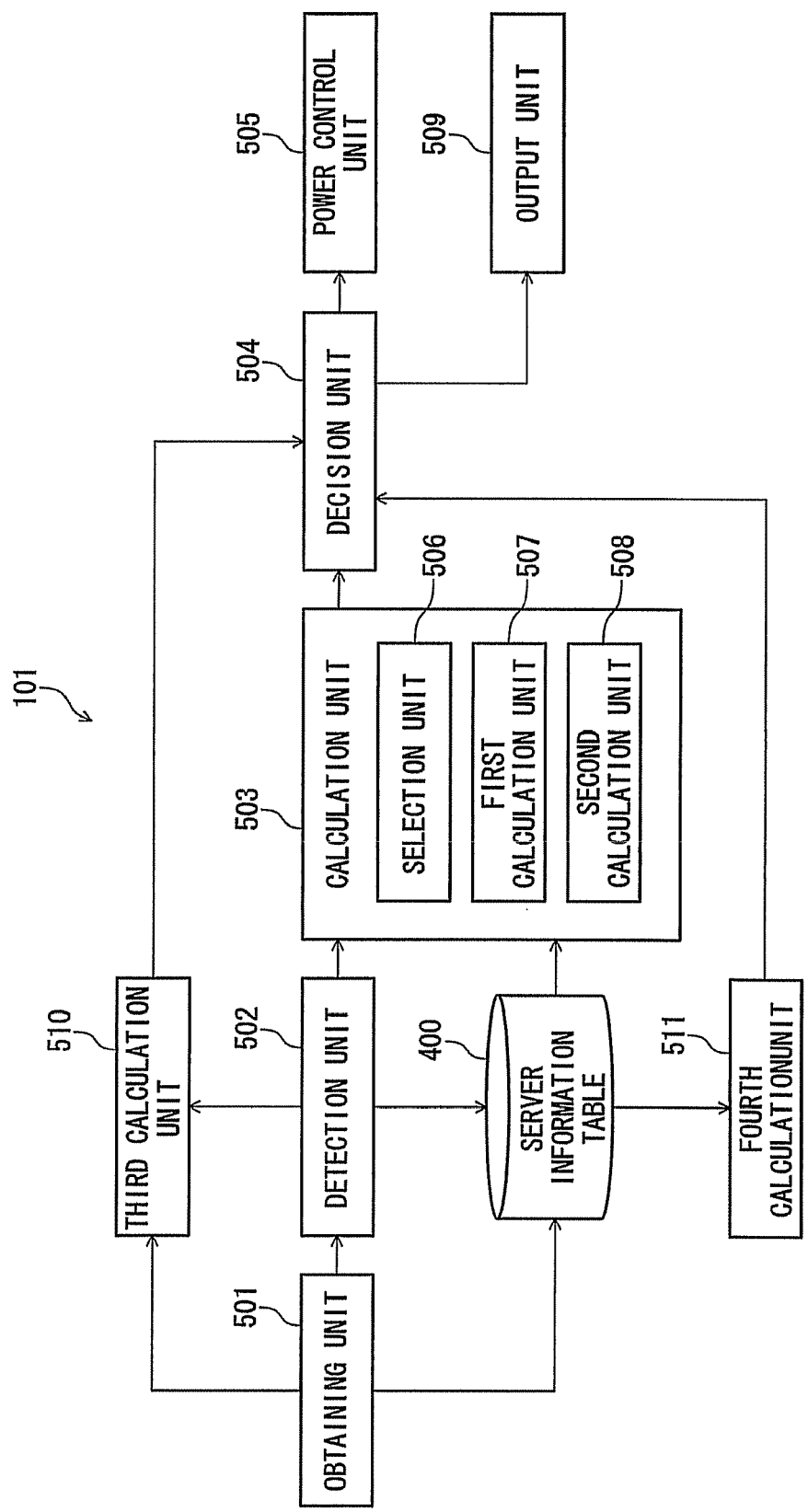
FIG. 5 illustrates a functional configuration of the power control device.

A power control device is disclosed. FIG. 5 illustrates the functional configuration of the power control device. The power control device 101 includes an obtaining unit 501, a detection unit 502, a calculation unit 503, a decision unit 504, a power control unit 505, a selection unit 506, a first calculation unit 507, a second calculation unit 508, an output unit 509, a third calculation unit 510, and a fourth calculation unit 511. Regarding these functions which become a control unit (the obtaining unit 501 to the fourth calculation unit 511). The functions are realized, for example, by causing the CPU 301 to execute a program stored in a storage area of the ROM 302, the RAM 303, the magnetic disk 305, the optical disk 307 or the like illustrated in FIG. 3, or by the I/F 309.

The obtaining unit 501 has a function of obtaining information regarding the temperatures of the servers M1 to Mn. For example, the obtaining unit 501 receives the information including the CPU temperature and the chassis temperature of each of the servers M1 to Mn, from the temperature sensor embedded in each of the servers M1 to Mn. It should be noted that the information including the CPU temperature and the chassis temperature is transmitted from each temperature sensor at the predetermined time interval (for example, at a time interval of 10 minutes).

Moreover, the obtaining unit 501 receives information regarding processes running on the servers M1 to Mn. For example, the obtaining unit 501 receives information including the virtual machine ID of the virtual machine operating in the running environment on each of the servers M1 to Mn, and the application ID of the application running on the virtual machine, from the servers M1 to Mn. It should be noted that the information including the virtual machine ID and the application ID is transmitted from the servers M1 to Mn, depending on the application running status. Moreover, an obtaining result which has been obtained is stored, for example, in the server information table 400 illustrated in FIG. 4.

The detection unit 502 has a function of detecting a group of the not-yet-powered-on servers from the servers M1 to Mn. For example, the detection unit 502 detects the group of the not-yet-powered-on servers by using a command (for example, a ping command) for confirming operation statuses of the servers M1 to Mn. It should be noted that a detection result which has been detected is stored in the storage area of the RAM 303, the magnetic disk 305, the optical disk 307 or the like.

Here, a specific example of the detection result (a power supply state list) is disclosed. FIG. 6 is an explanatory diagram illustrating a specific example of the power supply state list. In FIG. 6, a power supply state list 600 has not-yet-powered-on server IDs and powered-on server IDs. Here, the not-yet-powered-on server IDs are the server IDs of the not-yet-powered-on servers (detected servers). The powered-on server IDs are the server IDs of the powered-on servers (undetected servers).

The calculation unit 503 has a function of, for each not-yet-powered-on server, calculating the index value indicating the correlation of the heat generation amounts between the not-yet-powered-on server and the powered-on servers, based on the server information 400-1 to 400-n. For example, the calculation unit 503 calculates the index value of each not-yet-powered-on server, based on distances and the temperature ratios (or the temperature differences) between the not-yet-powered-on server and the powered-on servers. It should be noted that specific processing contents of a calculation process are disclosed later. Moreover, a calculation result which has been calculated is stored in the storage area of the RAM 303, the magnetic disk 305, the optical disk 307 or the like.

The decision unit 504 has a function of deciding the server which becomes the power-on target, from the group of the not-yet-powered-on servers, based on the index value of each not-yet-powered-on server. It should be noted that specific processing contents of a decision process are disclosed later.

Moreover, a decision result which has been decided is stored in the storage area of the RAM 303, the magnetic disk 305, the optical disk 307 or the like.

The power control unit 505 has a function of powering on a power-on target server based on the decided decision result. For example, the power control unit 505 powers on the power-on target server by using a Wake-On-LAN function. It should be noted that the Wake-On-LAN function is a function of remotely operating a power supply state of a computer device connected to the network 110.

Here, the specific processing contents of various processes in the calculation unit 503 and the decision unit 504 as described above are disclosed. It should be noted that, hereinafter, an arbitrary server in the group of the not-yet-powered-on servers (for example, servers M1, M3, M4, . . . illustrated in FIG. 6) is described as "server Mi". Moreover, an arbitrary powered-on server in a group of the powered-on servers (for example, servers M2, M5, M7, . . . illustrated in FIG. 6) is described as "server Mj".

First, the selection unit 506 has a function of selecting the arbitrary server Mi from the group of the not-yet-powered-on servers. For example, the selection unit 506 selects the arbitrary server Mi from the power supply state list 600 illustrated in FIG. 6, with the not-yet-powered-on server ID as a clue. Furthermore, the selection unit 506 selects the arbitrary server Mj from the group of the powered-on servers. For example, the selection unit 506 selects the arbitrary server Mj from the power supply state list 600, with the powered-on server ID as a clue. It should be noted that a selection result which has been selected is stored in the storage area of the RAM 303, the magnetic disk 305, the optical disk 307 or the like.

The first calculation unit 507 has a function of calculating a multiplication value of the distance and the temperature ratio between the servers Mi and Mj selected by the selection unit 506. For example, the first calculation unit 507 can calculate a multiplication value $q_{ij}$ by substituting the installation positions, the CPU temperatures and the chassis temperatures of the server Mi and the server Mj, into the following Equation (1), with reference to the server information 400-1 to 400-n:

$$q_{ij} = \sqrt{(xi - xj)^2 + (yi - yj)^2 + (zi - zj)^2} + \frac{(T_1 j + T_2 j)^2}{(T_1 i + T_2 i)} \quad (1)$$

It should be noted that a calculation process in the first calculation unit 507 is repeated for the not-yet-powered-on server Mi, until there is no unselected powered-on server Mj which has not been selected from the power supply state list 600. As a result thereof, as many multiplication values $q_{ij}$ as the number of the powered-on servers are calculated for the not-yet-powered-on server Mi.

Figure 7:
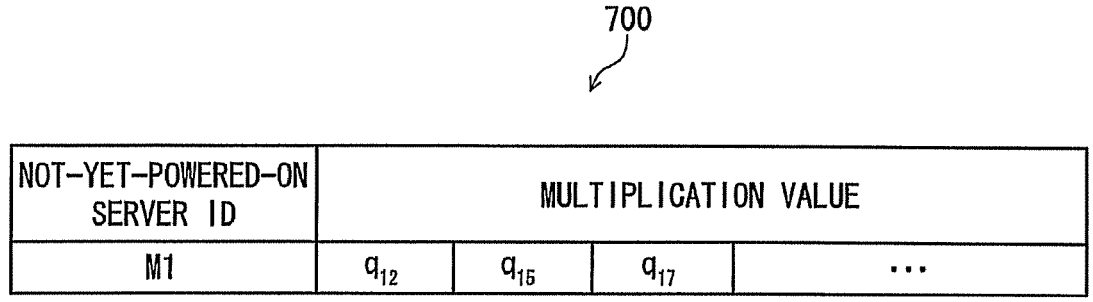
FIG. 7 illustrates an exemplary multiplication value list.

Here, a specific example of a calculation result (multiplication value list) provided by the first calculation unit 507 are disclosed. FIG. 7 is an explanatory diagram illustrating the specific example of the multiplication value list. In FIG. 7, a multiplication value list 700 has as many multiplication values $q_{1j}$ as the number of the powered-on servers Mj (j=2, 5, 7, . . . ), for the not-yet-powered-on server M1. It should be noted that this multiplication value list 700 has been stored in the storage area of the RAM 303, the magnetic disk 305, the optical disk 307 or the like.

The second calculation unit 508 has a function of calculating an index value Qi of the not-yet-powered-on server Mi by accumulating the multiplication value $q_{ij}$ of each powered-on server Mj calculated by the first calculation unit 507. For example, the second calculation unit 508 can calculate the index value Qi of the not-yet-powered-on server Mi by using the following Equation (2):

$$Qi = \sum_j q_{ij} \quad (2)$$

It should be noted that various processes in the selection unit 506 and the first and second calculation units 507 and 508 are repeated, for example, until there is no unselected server which has not been selected from the power supply state list 600. Here, a specific example of a calculation result (index value list) provided by the second calculation unit 508 are disclosed.

Figure 8:
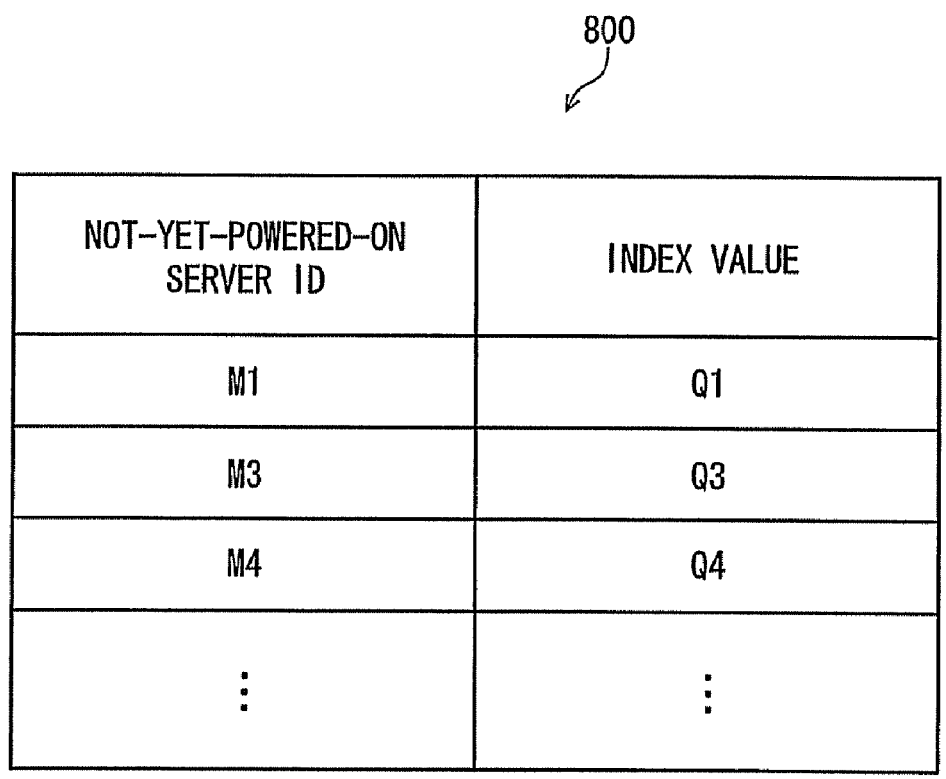
FIG. 8 illustrates an exemplary index value list.

FIG. 8 is an explanatory diagram illustrating the specific example of the index value list. In FIG. 8, an index value list 800 has the index value Qi of each not-yet-powered-on server Mi. It should be noted that this index value list 800 has been stored in the storage area of the RAM 303, the magnetic disk 305, the optical disk 307 or the like.

In this case, the decision unit 504 decides the server which becomes the power-on target, from the group of the not-yet-powered-on servers, with reference to the index value list 800 illustrated in FIG. 8. For example, the decision unit 504 may decide the server as the power-on target, in order from the server having a larger index value Qi. It should be noted that, hereinafter, a maximum index value among the index values of the group of the not-yet-powered-on servers is described as "maximum index value $Q_{max}$".

Thereby, the server installed in the space having the high cooling efficiency can be decided as the power-on target, from the group of the not-yet-powered-on servers. As a result thereof, it is possible to attempt the uniformization of the temperature distribution within the data center 100, and to reduce the power consumption for the air conditioner.

Moreover, the decision unit 504 may decide the server which becomes the power-on target, based on the index value Qi of each not-yet-powered-on server Mi, and an installation position of the air conditioner within the data center 100. Here, the installation position of the air conditioner is, for example, an installation position of an outlet for the air conditioning. It should be noted that the installation position of the air conditioner has been previously stored, for example, in the storage area of the RAM 303, the magnetic disk 305, the optical disk 307 or the like.

Moreover, the installation position of the air conditioner may be, for example, a coordinate position of the outlet, or may be an installation surface of the outlet (for example, a ceiling or a floor surface). Here, in consideration of the installation position of the air conditioner, an example of specific processing contents for deciding the power-on target are disclosed. It should be noted that a case where the outlet for the air conditioning has been installed on a ceiling side will be herein described by way of example.

In this case, first, the decision unit 504 specifies the server of which the index value Qi is within a predetermined range of the maximum index value $Q_{max}$, in the group of the not-yet-powered-on servers, as a power-on candidate. It should be noted that the predetermined range regarding the index value can be arbitrarily set. Here, if a plurality of the power-on candidates have been specified, the server which is nearest to the installation surface of the outlet for the air conditioning is decided as the power-on target from those power-on candidates.

For example, with reference to the server information 400-1 to 400-n, the decision unit 504 decides the server having a maximum z-coordinate (on the ceiling side) among the respective servers of the power-on candidates, as the power-on target. Thereby, the server installed in a space having a high cooling capability with the air conditioner and the space having the high cooling efficiency can be decided as the power-on target from the group of the not-yet-powered-on servers.

Moreover, if the plurality of the power-on candidates have been specified, the decision unit 504 may decide the server having a lowest temperature among those power-on candidates, as the power-on target. For example, with reference to the server information 400-1 to 400-n, the decision unit 504 decides the server of which a value of a sum of the CPU temperature and the chassis temperature becomes minimum, as the power-on target.

The output unit 509 has a function of outputting the decided decision result. For example, the output unit 509 may list and output the server IDs of the power-on target servers. Output forms include, for example, displaying on the display 308, outputting to the printer 313 for printing, and transmission to the external device by the I/F 309. Moreover, storage in the storage area of the RAM 303, the magnetic disk 305, the optical disk 307 or the like may be performed.

Thereby, in the group of the not-yet-powered-on servers, the server installed in the space having the high cooling efficiency can be presented. As a result thereof, for example, an administrator can arbitrarily decide the power-on target based on contents of a contract with a customer of the data center 100, or the like. Moreover, the power-on target server can be powered on by using another computer device having a power control function.

It should be noted that the decision process by the above described decision unit 504 is repeated, for example, until the number of the servers decided as the power-on target satisfies the number of required servers. For example, the number of required servers may be accepted by the obtaining unit 501, via a user's operation input by using the keyboard 310 or the mouse 311 illustrated in FIG. 3. Moreover, the number of required servers may be obtained by using a run schedule list 900 illustrated in FIG. 9.

Here, specific processing contents for obtaining the number of required servers are disclosed. First, the obtaining unit 501 obtains the number of processes scheduled to be run within a predetermined time (for example, 30 minutes) from the current time instant. For example, with reference to the run schedule list 900 illustrated in FIG. 9, the obtaining unit 501 obtains the number of applications scheduled to be run within the predetermined time. It should be noted that the current time instant is kept in the power control device 101.

FIG. 9 is an explanatory diagram illustrating a specific example of the run schedule list. In FIG. 9, the run schedule list 900 has the application ID, a scheduled time instant for run and a scheduled time instant for termination, for each application. Here, it is assumed that the current time instant is "21:00" and the predetermined time is "30 minutes". In this case, with reference to the run schedule list 900, the obtaining unit 501 obtains the number of applications scheduled to be run by "21:00 to 21:30".

It should be noted that, although illustration is omitted, the run schedule list 900 may include the server ID to which the application is assigned. Thereby, an assignment status of the application in each of the servers M1 to Mn at an arbitrary time instant can be determined. This run schedule list 900 is inputted, for example, by operating the keyboard 310 or the mouse 311 by the user.

Moreover, with reference to the server information 400-1 to 400-n, the detection unit 502 detects a group of not-yet-running servers which are not running the process, in the group of the powered-on servers. For example, the detection unit 502 detects the group of the not-yet-running servers which are not running the application, with the application ID as a clue.

The third calculation unit 510 calculates the number of servers required within the predetermined time, based on the number of processes scheduled to be run within the predetermined time, and the number of the not-yet-running servers in the group of the powered-on servers. For example, the number of required servers can be calculated by using the following Equation (3). However, the number of required servers is described as "MS", the number of applications scheduled to be run is described as "PS", and the number of the not-yet-running servers in the group of the powered-on servers is described as "US":

$$MS=PS-US \qquad (3)$$

It should be noted that the number of the not-yet-running servers US may be the number of servers to which the application is not scheduled to be assigned within the predetermined time, in the group of the powered-on servers. An application assignment schedule can be determined, for example, from an application assignment destination (not illustrated) included in the run schedule list 900.

Moreover, the third calculation unit 510 may obtain the number of required servers in consideration of the number of servers in which the run of the application is terminated within the predetermined time. In this case, the number of required servers can be calculated by using the following Equation (4). However, the number of servers in which the run of the application is terminated within the predetermined time is described as "ES":

$$MS=PS-(US+ES) \qquad (4)$$

It should be noted that if the number of servers MS obtained by using the above described Equation (4) is negative, MS=0. This indicates that extra not-yet-running servers (or servers which turn to be not-yet-running within the predetermined time) exist for the number of applications scheduled to be run PS.

Thereby, it is possible to grasp the number of servers required within the predetermined time, in advance. As a result thereof, the servers required for running the application can be started in advance, and reduction in an application processing time can be attempted. Moreover, an inrush current can be temporally distributed by performing the power-on of the servers in a stepwise manner, and a burden on a power supply facility within the data center 100 can be reduced (a lifetime of the facility can be extended).

Moreover, in an exemplary power consumption reduction scheme, among the not-yet-running (powered-on) servers which are not running the process, the server installed in a space having a low cooling efficiency may be powered off. Hereinafter, specific processing contents for deciding the server which becomes a power-off target are disclosed.

First, for each not-yet-running server in the group of the powered-on servers, the calculation unit 503 calculates the index value indicating the correlation of the heat generation amounts between the above described not-yet-running server and the powered-on servers. For example, similarly to the index value Qi of the above described not-yet-powered-on server, the index value of the not-yet-running server can be calculated by using the above described Equations (1) and (2).

The decision unit 504 decides the server which becomes the power-off target, from the group of the not-yet-running servers, based on the calculated index value of each not-yet-running server. For example, the decision unit 504 decides the server as the power-off target, in order from the server having a larger index value, in the group of the not-yet-running servers.

In this case, the power control unit 505 powers off the server decided as the power-off target. For example, the power control unit 505 powers off a power-off target server by using the Wake-On-LAN function. Thereby, the not-yet-running server which is not running the application, and which is also the server installed in the space having the low cooling efficiency, can be powered off.

Moreover, in an exemplary power consumption reduction scheme, if a temperature distribution of a server running the process (hereinafter referred to as "running server") is concentrated on a local space within the data center 100, the running process may be migrated. Hereinafter, specific processing contents when the running process is migrated are disclosed.

With reference to the server information 400-1 to 400-$n$, the fourth calculation unit 511 calculates an average value of the temperatures (for example, the CPU temperature and the chassis temperature) between the running server and servers adjacent to the above described server (hereinafter referred to as "adjacent servers"). Here, the adjacent servers include, for example, servers above and below the server on the same rack (at the same x-coordinate and the same y-coordinate), and servers at the same tier number of adjacent racks (at the same z-coordinate). For example, the fourth calculation unit 511 calculates the average value of the temperatures which are the sum of the CPU temperature and the chassis temperature, between the running server and the adjacent servers.

The decision unit 504 decides the server which becomes the power-off target, from a group of the running servers, based on a calculation result calculated by the fourth calculation unit 511. In other words, the running server installed in the local high-temperature space within the data center 100 is specified based on the average value of the temperatures of each running server.

For example, the decision unit 504 may decide the running server having a maximum value of the above described average temperature, as the power-off target. Moreover, an arbitrary approach may be used to specify the server installed in the local high-temperature space, based on the average temperature of each server, and to decide the server which becomes the power-off target. In this case, the power control unit 505 powers off the server decided as the power-off target.

Moreover, the decision unit 504 may decide a destination server to which the process running on the server decided as the power-off target is migrated, based on the index value of each not-yet-powered-on server. In other words, a migration destination for the application running on the server installed in the local high-temperature space within the data center 100 is decided. It should be noted that this decision approach is similar to an approach for deciding the server which becomes the power-on target, and thus a description thereof is omitted.

In this case, the power control unit 505 powers on the server decided as the migration destination. The power control unit 505 migrates the process running on the server decided as the power-off target, to the server decided as the migration destination. It should be noted that specific processing contents of a migration process are publicly known, and thus a description thereof is omitted.

Thereby, the application being run on the server installed in the space having the low cooling efficiency can be migrated to the server installed in the space having the high cooling efficiency.

Figure 10:
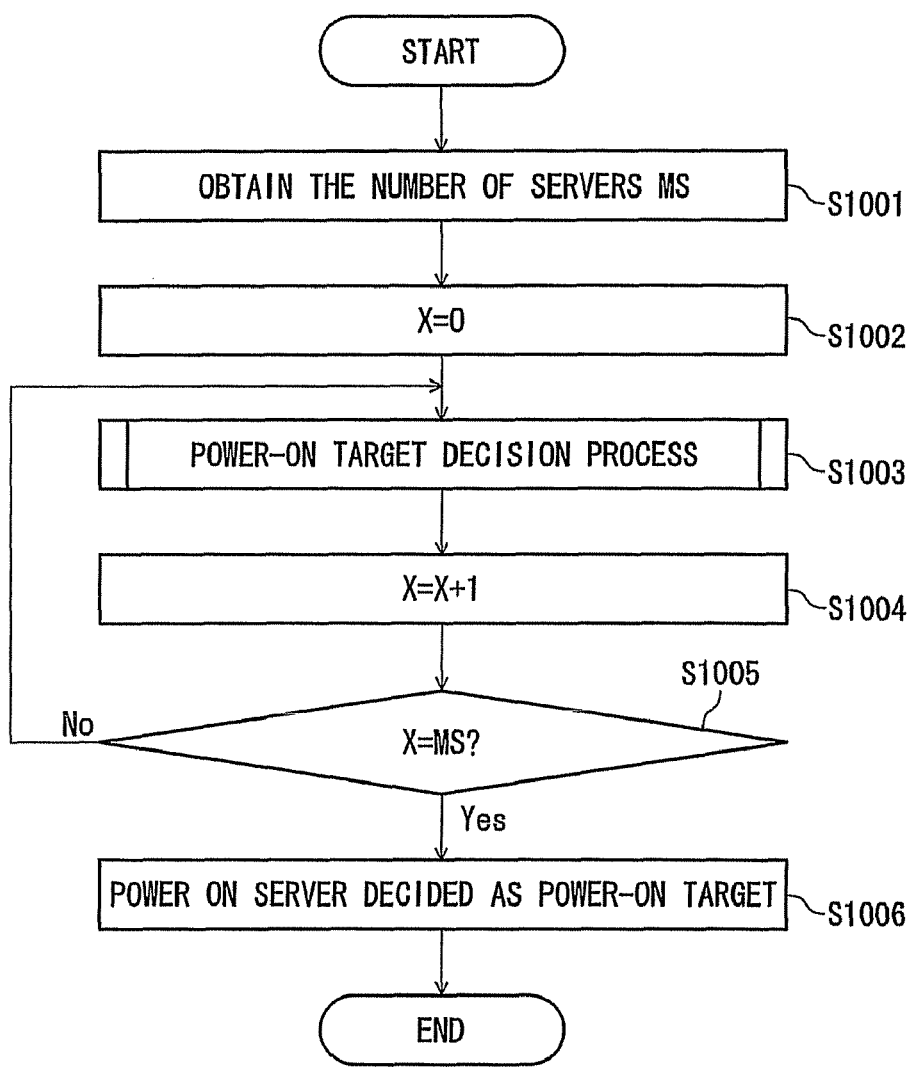
FIG. 10 illustrates an exemplary power control processing procedure in the power control device (No. 1).

A power control processing procedure in the power control device 101 is disclosed. The power control processing procedure in a case where the power-on target server is decided is disclosed. FIG. 10 is a flowchart illustrating an example of the power control processing procedure in the power control device (No. 1). In the flowchart of FIG. 10, first, the obtaining unit 501 obtains the number of required servers MS (operation S1001).

Subsequently, the number of servers decided as the power-on target X is initialized with X=0 (operation S1002). The power-on target decision process for deciding the server which becomes the power-on target, from the group of the not-yet-powered-on servers is executed (operation S1003).

Power control unit 505 increments the number of servers decided as the power-on target X (operation S1004), and it is determined whether or not X=MS (operation S1005). Here, if X<MS (operation S1005: No), the process returns to operation S1003.

On the other hand, if X=MS (operation S1005: Yes), finally, the power control unit 505 powers on the server decided as the power-on target (operation S1006), and a series of processes according to this flowchart are terminated.

Figure 11:
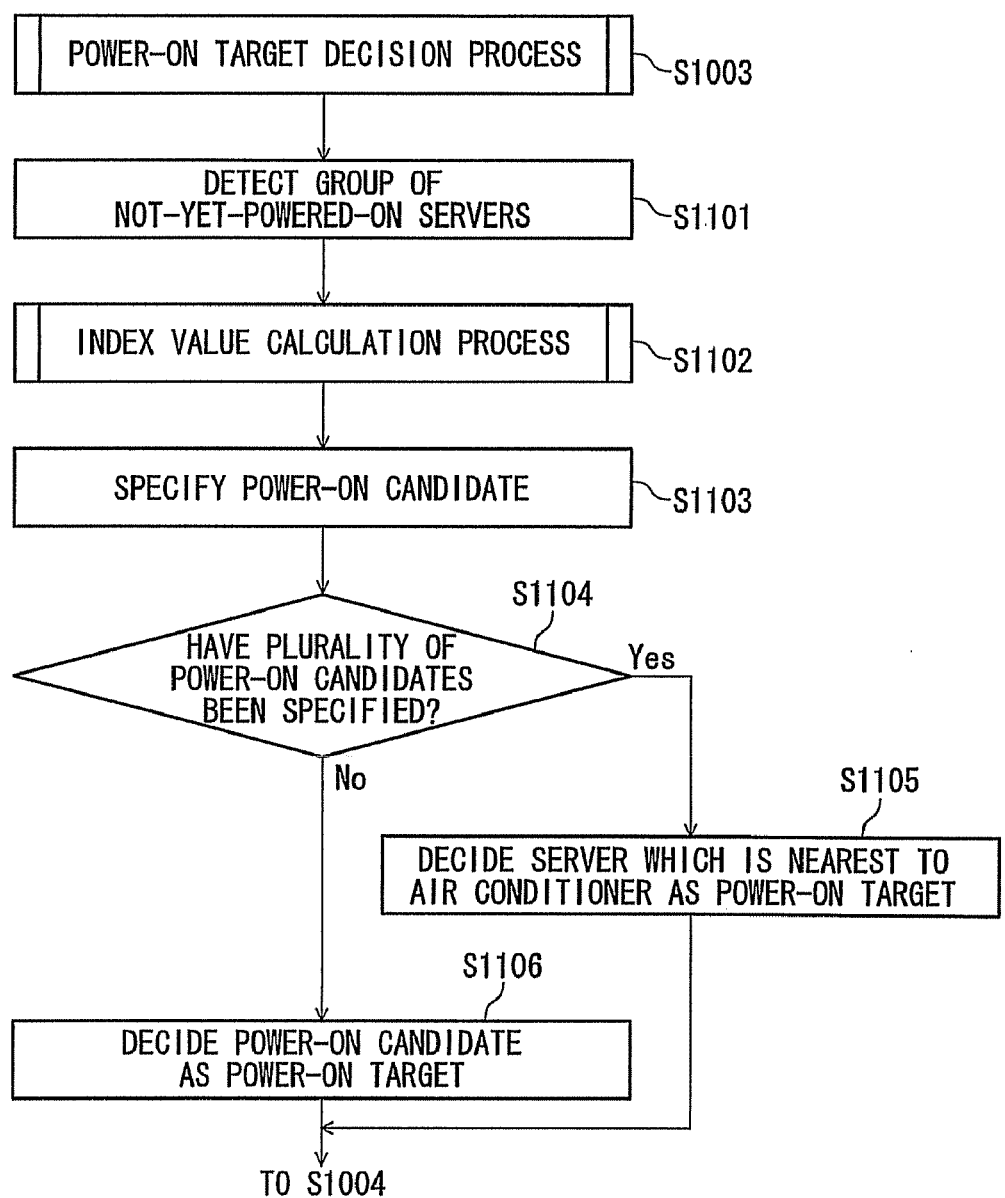
FIG. 11 illustrates an exemplary power-on target decision processing procedure.

A processing procedure of the power-on target decision process in operation S1003 illustrated in FIG. 10 are disclosed. FIG. 11 is a flowchart illustrating an example of the power-on target decision processing procedure. In the flowchart of FIG. 11, first, the detection unit 502 detects the group of the not-yet-powered-on servers from the servers M1 to Mn (operation S1101).

Subsequently, the calculation unit 503 executes an index value calculation process for calculating the index value Qi indicating the correlation of the heat generation amounts between the not-yet-powered-on server Mi and the powered-on server Mj, for each not-yet-powered-on server Mi (operation S1102). The decision unit 504 specifies the server of which the index value Qi is within the predetermined range of the maximum index value $Q_{max}$, in the group of the not-yet-powered-on servers, as the power-on candidate (operation S1103).

Here, the decision unit 504 determines whether or not the plurality of the power-on candidates have been specified (operation S1104), and if the plurality of the power-on candidates have been specified (operation S1104: Yes), among those power-on candidates, the server which is nearest to the air conditioner is decided as the power-on target (operation S1105), and the process proceeds to operation S1004 illustrated in FIG. 10.

On the other hand, if the plurality of the power-on candidates have not been specified (operation S1104: No), the decision unit 504 decides the power-on candidate server as the power-on target (operation S1106), and the process proceeds to operation S1004 illustrated in FIG. 10.

Figure 12:
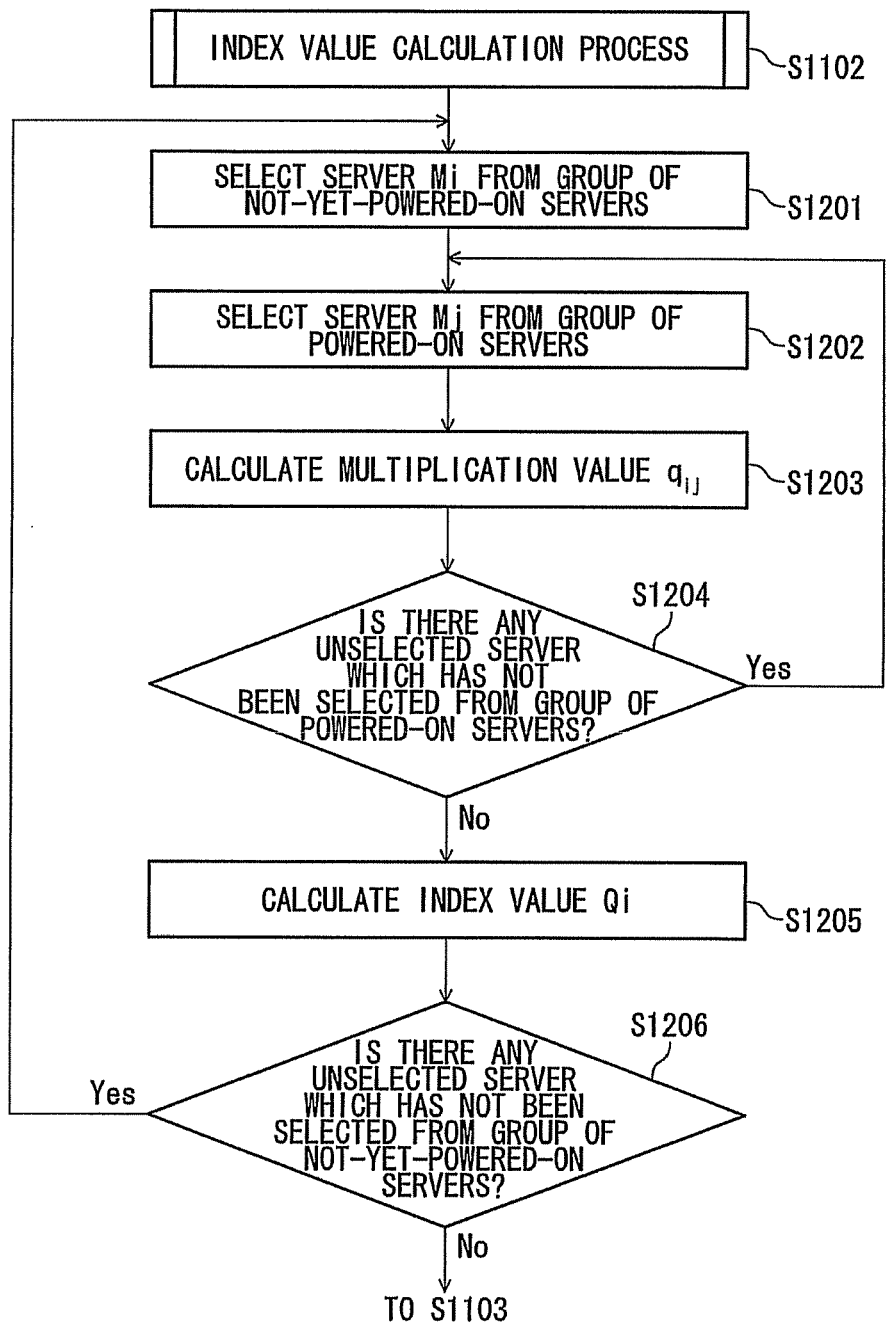
FIG. 12 illustrates an exemplary index value calculation processing procedure.

A processing procedure of the index value calculation process in operation S1102 illustrated in FIG. 11 is disclosed. FIG. 12 is a flowchart illustrating an example of the index value calculation processing procedure. In the flowchart of FIG. 12, first, the selection unit 506 selects the arbitrary server Mi from the group of the not-yet-powered-on servers (operation S1201).

Furthermore, the selection unit 506 selects the arbitrary server Mj from the group of the powered-on servers (operation S1202). The first calculation unit 507 calculates the multiplication value $q_{ij}$ of the distance and the temperature ratio between the servers Mi and Mj by using the above described Equation (1) (operation S1203).

Subsequently, the selection unit 506 determines whether or not there is any unselected server which has not been selected from the group of the powered-on servers (operation S1204). Here, if there is the unselected server (operation S1204: Yes), the process returns to operation S1202.

On the other hand, if there is no unselected server (operation S1204: No), the second calculation unit 508 calculates the index value Qi of the not-yet-powered-on server Mi by accumulating the multiplication value $q_{11}$ of each powered-on server Mj, by using the above described Equation (2) (operation S1205).

Subsequently, it is determined whether or not there is any unselected server which has not been selected from the group of the not-yet-powered-on servers (operation S1206), and if there is the unselected server (operation S1206: Yes), the process returns to operation S1201. On the other hand, if there is no unselected server (operation S1206: No), the process proceeds to operation S1103 illustrated in FIG. 11.

Figure 13:
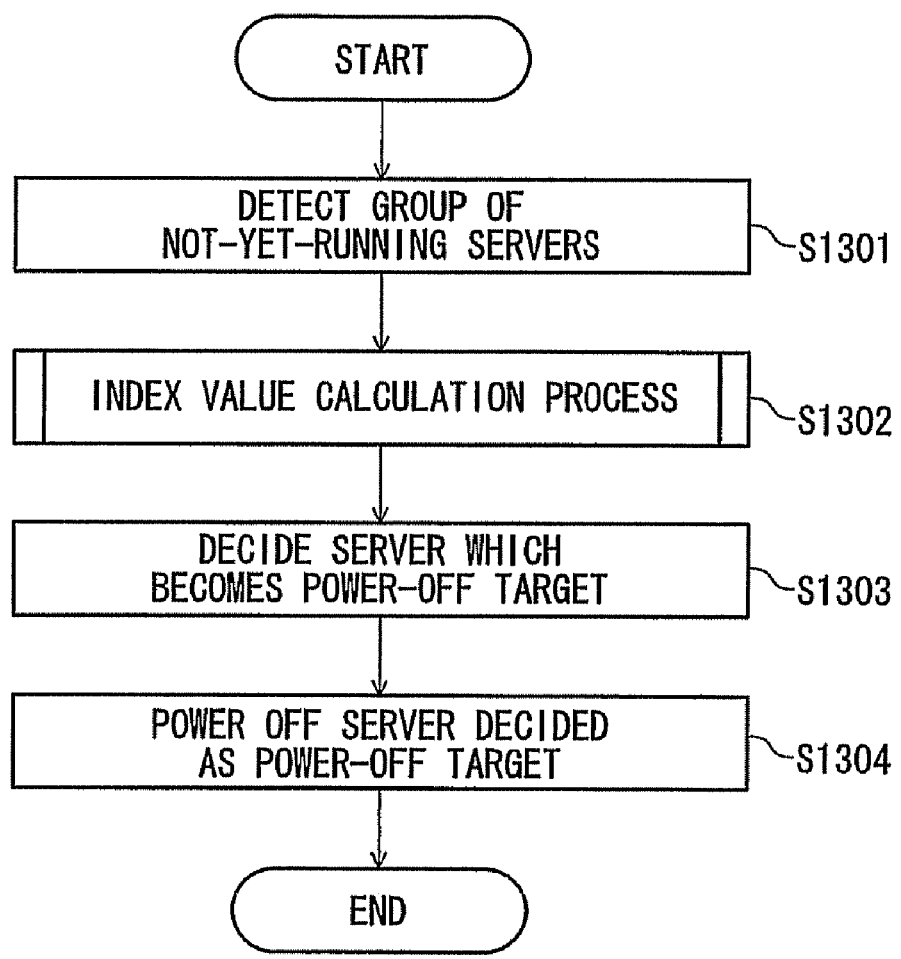
FIG. 13 is a flowchart illustrating an example of the power control processing procedure in the power control device (No. 2).

Next, the power control processing procedure in a case where the power-off target server is decided are disclosed. FIG. 13 illustrates a power control processing procedure in the power control device (No. 2). It should be noted that, for example, this power control process is automatically executed by the computer at a predetermined time interval.

In the flowchart of FIG. 13, detection unit 502 detects the group of the not-yet-running servers which are not running the application, among the powered-on servers (operation S1301). Subsequently, for each not-yet-running server, the calculation unit 503 executes the index value calculation process for calculating the index value indicating the correlation of the heat generation amounts between the above described not-yet-running server and the powered-on servers (operation S1302).

The decision unit 504 decides the server which becomes the power-off target, from the group of the not-yet-running servers, based on the index value of each not-yet-running server (operation S1303). Finally, the power control unit 505 powers off the server decided as the power-off target (operation S1304), and a series of processes according to this flowchart are terminated.

Figure 14:
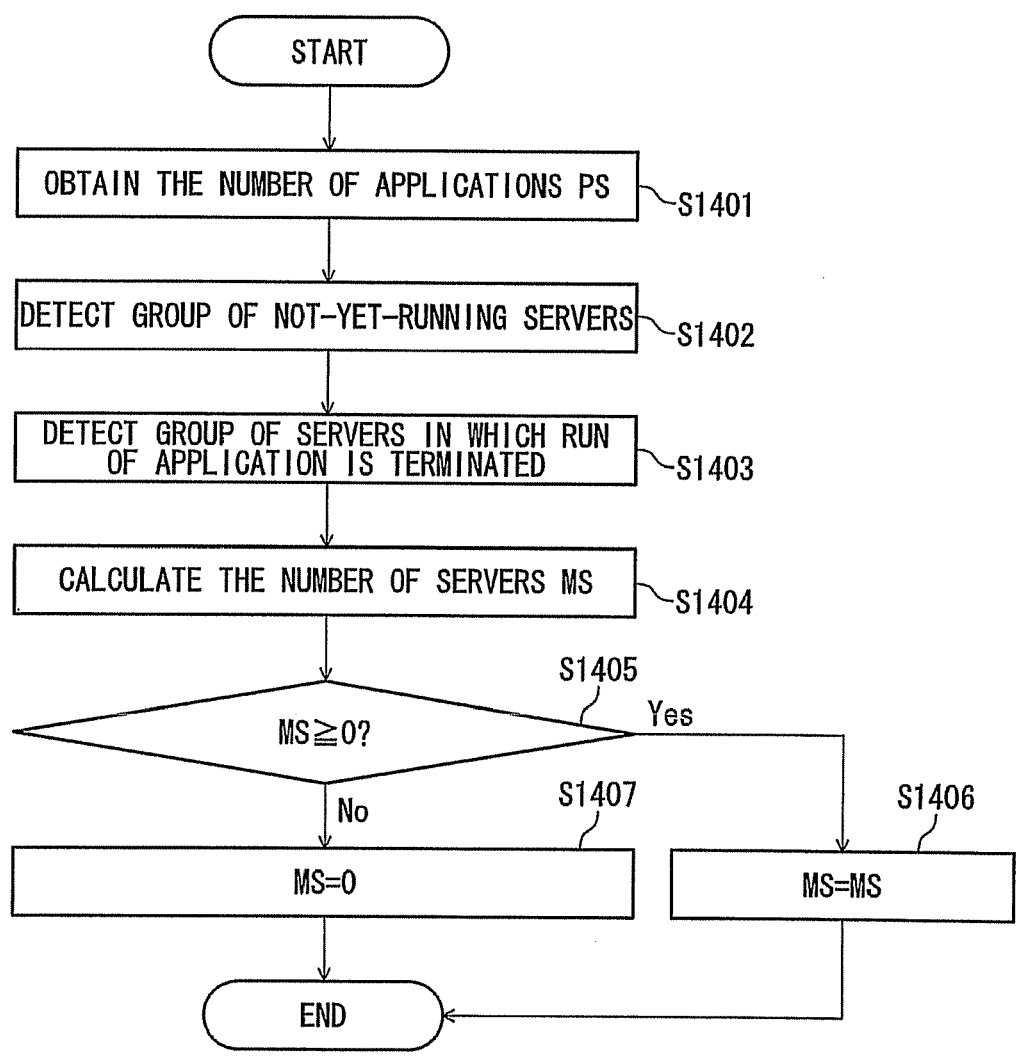
FIG. 14 illustrates an exemplary number of servers calculation processing procedure.

A number of servers calculation processing procedure for calculating the number of servers required within the predetermined time MS are disclosed. FIG. 14 is a flowchart illustrating an example of the number of servers calculation processing procedure. In the flowchart of FIG. 14, With reference to the run schedule list 900, the obtaining unit 501 obtains the number of applications scheduled to be run within the predetermined time PS (operation S1401).

Subsequently, with reference to the server information 400-1 to 400-$n$, the detection unit 502 detects the group of the not-yet-running servers which are not running the application (the number of servers US), in the group of the powered-on servers (operation S1402). Furthermore, with reference to the run schedule list 900, the detection unit 502 detects a group of the servers in which the run of the application is terminated within the predetermined time (the number of servers ES) (operation S1403).

The third calculation unit 510 calculates the number of servers MS by using the above described Equation (4) (operation S1404), and determines whether or not the number of servers MS is equal to or larger than 0 (operation S1405). Here, if MS≧0 (operation S1405: Yes), the output unit 509 outputs the number of servers MS as the number of required servers (operation S1406).

On the other hand, if MS<0 (operation S1405: No), the number of required servers is outputted as 0 (MS=0) (operation S1407). It should be noted that the power control process illustrated in FIG. 10 may be executed by using the number of servers MS obtained in operation 81406.

As described above, according to an exemplary embodiment, the server installed in the space having the high cooling efficiency can be decided as the power-on target, among the not-yet-powered-on servers. The power-on target can be decided in consideration of the distance between the not-yet-powered-on server Mi and the powered-on server Mj. Thereby, the distribution of the installation of the powered-on servers which become the heat generation sources can be dispersed, and the occurrence of the local high-temperature space in the data center 100 can be suppressed.

Moreover, the power-on target can be decided in consideration of the temperature ratio (or the temperature difference) between the not-yet-powered-on server Mi and the powered-on server Mj. Thereby, the server which is less affected by the hot air exhausted from the powered-on servers can be set as the power-on target, and the occurrence of the local high-temperature area in the data center 100 can be suppressed.

Moreover, the not-yet-running server which is not running the application, and which is also the server installed in the space having the low cooling efficiency, can be powered off. Furthermore, the application being run on the server installed in the space having the low cooling efficiency can be migrated to the server installed in the space having the high cooling efficiency.

According to an exemplary embodiment, it is possible to attempt the uniformization of the temperature distribution within the data center 100, and to reduce the power consumption for the air conditioner.

Among the not-yet-powered-on servers, the server installed in the space having the high cooling efficiency can be decided as the power-on target.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), and a CD-R (Recordable)/RW.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A non-transitory computer-readable recording medium encoded with a power consumption reduction support program containing instructions executable on a computer, the computer being capable of communicating with a plurality of servers installed within a facility, and capable of accessing a table in which server information including an installation position and a temperature of each of said servers within said facility is stored, the program causing the computer to execute a process comprising:
   detecting a group of not-yet-powered-on servers from said plurality of servers;
   calculating, for each not-yet-powered on server of the group of not-yet-powered-on servers, an index value indicating a correlation of heat generation amounts between said not-yet-powered-on server and powered-on servers including both accumulated distances and accumulated temperature ratios between said not-yet-powered on server and said powered-on servers, based on said server information stored in said table;
   deciding a server which becomes a power-on target, from said group of the not-yet-powered-on servers, based on said calculated index value of each not-yet-powered-on server; and
   outputting a decision result which has been decided.

2. The computer-readable recording medium according to claim 1, wherein said calculating comprises:
   calculating a multiplication value of the distance between the not-yet-powered-on server selected from said server group and said powered-on server, and the temperature ratio of said powered-on server to said not-yet-powered-on server, for each of said powered-on servers, and
   calculating said index value of said not-yet-powered-on server by accumulating the calculated multiplication value of each said powered-on server.

3. The computer-readable recording medium according to claim 2, wherein said deciding includes deciding the server which becomes said power-on target, based on the index value of said each not-yet-powered-on server, as a result of processes according to said calculating the multiplication value and said calculating said index value being executed until there is no unselected server which has not been selected from said server group.

4. The computer-readable recording medium according to claim 1, wherein said deciding includes deciding the server which becomes said power-on target, based on a calculation result which has been calculated and an installation position of an air conditioner within said facility.

5. The non-transitory computer-readable recording medium according to claim 1, the process comprising:
   powering on said server decided as said power-on target.

6. The computer-readable recording medium according to claim 1, the process comprising:
   obtaining a number of processes scheduled to be run within a predetermined time, and
   calculating a number of servers required within said predetermined time, wherein
   said detecting includes detecting a group of not-yet-running servers which are not running a process, among said powered-on servers, and
   said calculating the number of servers required within said predetermined time includes calculating based on said number of processes scheduled to be run and the number of said not-yet-running servers, and
   said deciding includes deciding said power-on target based on the number of servers required within said predetermined time.

7. The computer-readable recording medium according to claim 6, wherein
   said obtaining includes obtaining, among running processes, a number of processes of which said run is scheduled to be terminated within said predetermined time, and
   said calculating the number of servers required within said predetermined time includes calculating based on said number of processes scheduled to be run, said number of processes scheduled to be terminated, and said number of the not-yet-running servers.

8. The computer-readable recording medium according to claim 6, wherein
   for each of said not-yet-running servers, calculating the index value indicating the correlation of the heat generation amounts between said not-yet-running server and the powered-on servers,
   said deciding includes deciding a server which becomes a power-off target, from said group of the not-yet-running servers, based on the calculated index value of each said not-yet-running server, and
   the process comprising:
   powering off said decided server.

9. The computer-readable recording medium according to claim 6, the process comprising:
   calculating an average value of a temperature between a running server and servers adjacent to said running server, with a reference to said server information, and wherein
   said deciding includes deciding a server which becomes a power-off target, from a group of running servers, based on a calculation result calculated by said calculating said average value of said temperature.

10. The computer-readable recording medium according to claim 9, wherein said deciding includes deciding a destination server to which a process running on said server decided as said power-off target is migrated, based on the index value of said each not-yet-powered-on server.

11. The computer-readable recording medium according to claim 10, the process comprising:
   migrating said process running on said server decided as said power-off target, to a decided migration destination server.

12. An information processing device capable of communicating with a plurality of servers installed within a facility, the device comprising:
   a storage unit which stores server information including an installation position and a temperature of each of said servers within said facility;
   a detection unit which detects a group of not-yet-powered-on servers from said plurality of servers;
   a calculation unit which, for each detected not-yet-powered-on server of the group of not-yet-powered-on servers, calculates an index value indicating a correlation of heat generation amounts between said not-yet-powered-on server and powered-on servers including both accumulated distances and accumulated temperature ratios between the not-yet-powered on server and the powered-on servers, based on the server information stored in said storage unit;
   a decision unit which decides a server which becomes a power-on target, from said group of the not-yet-powered-on servers, based on the calculated index value of each not-yet-powered-on server; and
   an output unit which outputs a decision result which has been decided.

13. A power consumption reduction support method executed by a computer including control unit and storage unit, and being capable of communicating with a plurality of servers installed within a facility, and capable of accessing a table in which server information including an installation position and a temperature of each of said servers within said facility is stored, the method comprising:

detecting a group of not-yet-powered-on servers from said plurality of servers, and storing the group of the not-yet-powered-on servers in said storage unit, by said control unit;

calculating an index value, for each not-yet powered on server of the group of not-yet-powered-on servers, indicating a correlation of heat generation amounts between said not-yet-powered-on server and powered-on servers including both accumulated distances and accumulated temperature ratios between the not-yet-powered on server and the powered-on servers, based on the server information stored in said table, and storing the index value in said storage unit, by said control unit;

deciding a server which becomes a power-on target, from said group of the not-yet-powered-on servers, based on the calculated index value of each not-yet-powered-on server, and storing the server which becomes the power-on target, in said storage unit, by said control unit; and outputting a decision result which has been decided, by said control unit.

* * * * *